(12) United States Patent
Sinn et al.

(10) Patent No.: US 9,137,121 B1
(45) Date of Patent: Sep. 15, 2015

(54) MANAGING NETWORKS UTILIZING NETWORK SIMULATION

(75) Inventors: Frederick David Sinn, Seattle, WA (US); Justin O. Pietsch, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 657 days.

(21) Appl. No.: 13/332,159

(22) Filed: Dec. 20, 2011

(51) Int. Cl.
*H04L 12/24* (2006.01)
*H04L 12/751* (2013.01)

(52) U.S. Cl.
CPC ............. *H04L 41/14* (2013.01); *H04L 41/08* (2013.01); *H04L 45/02* (2013.01)

(58) Field of Classification Search
CPC ......... H04L 45/02; H04L 63/00; H04L 65/00; H04L 41/08; H04L 41/14; H04L 41/45
USPC ................................................ 709/221, 224
See application file for complete search history.

(56) References Cited

U.S. PATENT DOCUMENTS

| 7,756,017 B2 * | 7/2010 | Goyal et al. ................ 370/225 |
| 8,032,409 B1 * | 10/2011 | Mikurak .................... 705/14.39 |
| 8,271,336 B2 * | 9/2012 | Mikurak ........................ 705/22 |
| 8,437,280 B2 * | 5/2013 | Grover ......................... 370/255 |

* cited by examiner

Primary Examiner — Kristie Shingles
(74) Attorney, Agent, or Firm — Knobbe Martens Olson & Bear LLP (57) ABSTRACT

Systems and methods are disclosed which facilitate the management of changes to a hosted network. In one aspect, a resource optimization manager obtains an identification of one or more changes to be implemented on a hosted network. The network validation manager component simulates the implementation of the identified changes and records state information associated with the monitored simulation. The network validation manager component generates a network change template that includes the information recorded from the simulation of the change to the hosted network. In another aspect, the network validation manager component can utilize network change templates to monitor the implementation of changes to the hosted network. The network change templates can then be utilized to determine whether to proceed with implementation of the change to the hosted network or whether to revert the hosted network to a condition prior to the implementation of the identified change.

25 Claims, 5 Drawing Sheets

MANAGING NETWORKS UTILIZING NETWORK SIMULATION

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

In operation, a data center may need to configure, update, or modify components of an active network. For example, a data center may need to modify routing information utilized by one or more components or make modifications to the network topology. For purposes of scaling, however, data centers often would like to utilize automated tools to implement the configurations, updates, or modifications. However, such automated tools typically do not have an ability to monitor and assess state information associated with components of a hosted network, often referred to as the health of the network.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Generally described, aspects of the present disclosure relate to the management of hosted networks. Specifically, systems and methods are disclosed which facilitate the management of changes to a hosted network. Generally described, the changes to the hosted network can include a variety of modifications, additions, configurations to one or more components of hosted network. For purposes of the present application, such modifications, additions, configurations to one or more components of hosted network will be generally referred to as changes to the hosted network. Additionally, the hosted network can correspond to one or more configured physical computing devices, one or more host computing devices having configured virtual machine instances, and a combination thereof.

In one aspect, a resource optimization manager obtains an identification of one or more changes to be implemented on a hosted network. The network validation manager component then generates or obtains a model of the hosted network, such as through a modeling tool or simulation tool. The network validation manager component can simulate the implementation of the identified changes to the modeled network. During such a simulation, the network validation manager component can record state information associated with the at least some of the components associated with the simulated network. Additionally, the network validation manager component can conduct validation testing to determine whether the simulated change is likely to generate a fault condition in any of the components of the modeled network. Based on the monitored simulation, the network validation manager component generates a network change template that includes the information recorded from the simulation of the change to the modeled, hosted network.

In another aspect, the network validation manager component can utilize network change templates to monitor the implementation of changes to the hosted network. Illustratively, the network validation manager component receives an identification of one or more changes and obtains a corresponding network change template. During the implementation of the change on the hosted network, the network validation manager component records state information associated with at least some of the components associated with the hosted network. The network validation manager component then compares the state information with state information included in the network change template. The network change templates can then determine whether to proceed with implementation of the change to the hosted network or whether to revert the hosted network to a condition, or state, prior to the implementation of the identified change.

While specific embodiments and example applications of the present disclosure will now be described with reference to the drawings, these embodiments and example applications are intended to illustrate, and not limit, the present disclosure. Specifically, while various embodiments and aspects of the present disclosure will be described with regard to virtual machine instances running applications, one or more aspects of the present disclosure can be applied with physical computing devices or combinations of physical computing devices and virtual machine instances.

Figure 1:
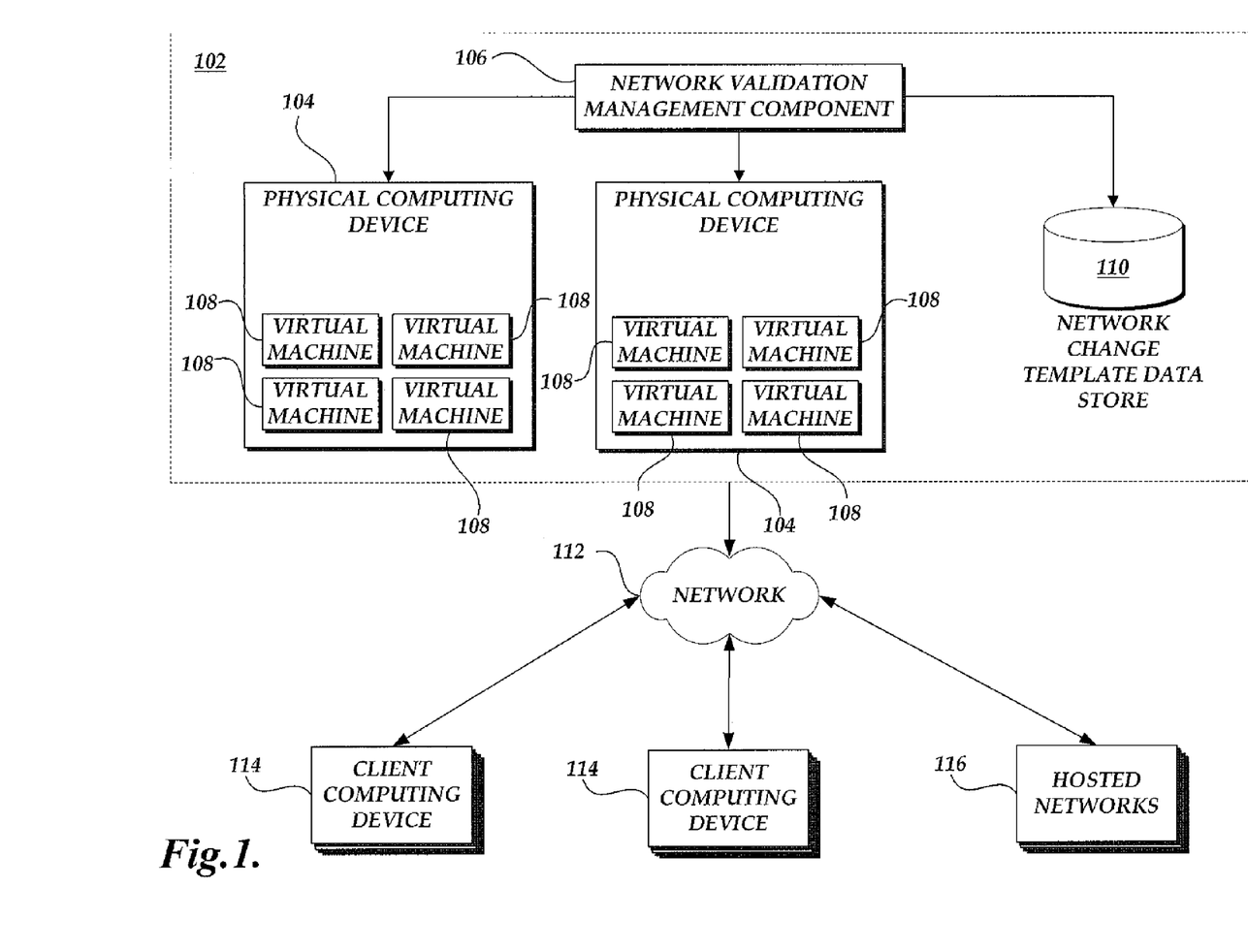
FIG. 1 is a block diagram depicting an illustrative environment for managing hosted networks including a hosted virtual network, a number of computing devices, and a network validation manager component.

FIG. 1 is a block diagram illustrating an embodiment of network management environment 100. The network management environment 100 includes a virtual network 102 that includes multiple physical computing devices 104. Each physical computing device 104 is capable of hosting multiple virtual machine instances 108. At least some of the virtual machine instances 108 may be provisioned to implement portions of a hosted network or to simulate one or more components of a hosted network.

Illustratively, the virtual machine instances 108 may be configured to provide specific functionality associated with the components of the hosted network or simulation of the components of the hosted network. Examples of the types of desired functionality, include but are not limited to: database management, serving or distributing data or content (e.g., Web servers), managing load balancing or network resources, managing network connectivity or security, providing network addressing information, managing client or server redirection, or any other functionality associated with a data center. Additionally, one or more virtual machine instances 108 may be provisioned generically when a desired functionality is not specified or is otherwise not available. One skilled in the relevant art will appreciate that the virtual network 102 is logical in nature and can encompass physical computing devices 104 from various geographic regions.

The virtual network 102 also includes a network validation manager component 106 for managing the implementation of changes to a hosted network based on generated network change templates. As will be explained in greater detail below with regard to FIGS. 2A and 2B, in one aspect, the network validation manager component 106 may simulate at least portions of a hosted network and generate one or more network change templates based on observations/testing of the simulated components of the hosted network. In another aspect, the network validation manager component 106 can utilize generated network change templates to monitor the implementation of changes to a hosted network and identify potential fault or error conditions. Illustratively, the network validation manager component 106 can include various components for implementing the functions of the network validation manager component, such as client interface component(s), network simulation interface(s), and data processing component(s). Still further, the network validation manager component 106 can also incorporate additional modules for generating the hosted network simulation. For example, the network validation manager component 106 can include an interface for causing the generation of a network simulation by a third party network service. In another example, the network validation manager component 106 can include modules or components for generating the model of hosted network or simulating changes to a modeled, hosted network.

It should be appreciated that, although the network validation manager component 106 is depicted for the purpose of example as a single logical component in illustrative FIG. 1, the routines and steps performed by the resource optimization manager component 106 may be distributed among any number of components and executed in hardware or software. Additionally, although the network validation manager component 106 is illustrated as logically associated with virtual network 102, the resource optimization manager component 106 may be implemented in a separate networked environment or in conjunction with client computing devices 114.

With continued reference to FIG. 1, the virtual network 102 can further include a network change data store 110 for maintaining state information and simulated network validation information generated, or otherwise obtained, by the network validation manager component 106. The network change data store 110 may correspond to network attached storage (NAS), database servers, which may be implemented in a centralized or distributed manner.

Connected to the virtual network 102 via a network 112 are multiple client computing devices 114. The network 112 may be, for instance, a wide area network (WAN), a local area network (LAN), or a global communications network. In some instances, the client computing devices 114 may interact with the virtual network 102 to request the resource optimizations for virtual machine instance types based on a definition of one or more applications associated with the virtual machine instance type. Still further, in some embodiments, the hosted network managed by the network validation manager component 106 may be separate from the virtual network 102, as illustrated in hosted network 116. As previously described, the hosted network, such as hosted network 116, may be made up of a number of physical computing devices, virtual machines hosted on a physical computing devices, or a combination thereof.

Figure 2A:
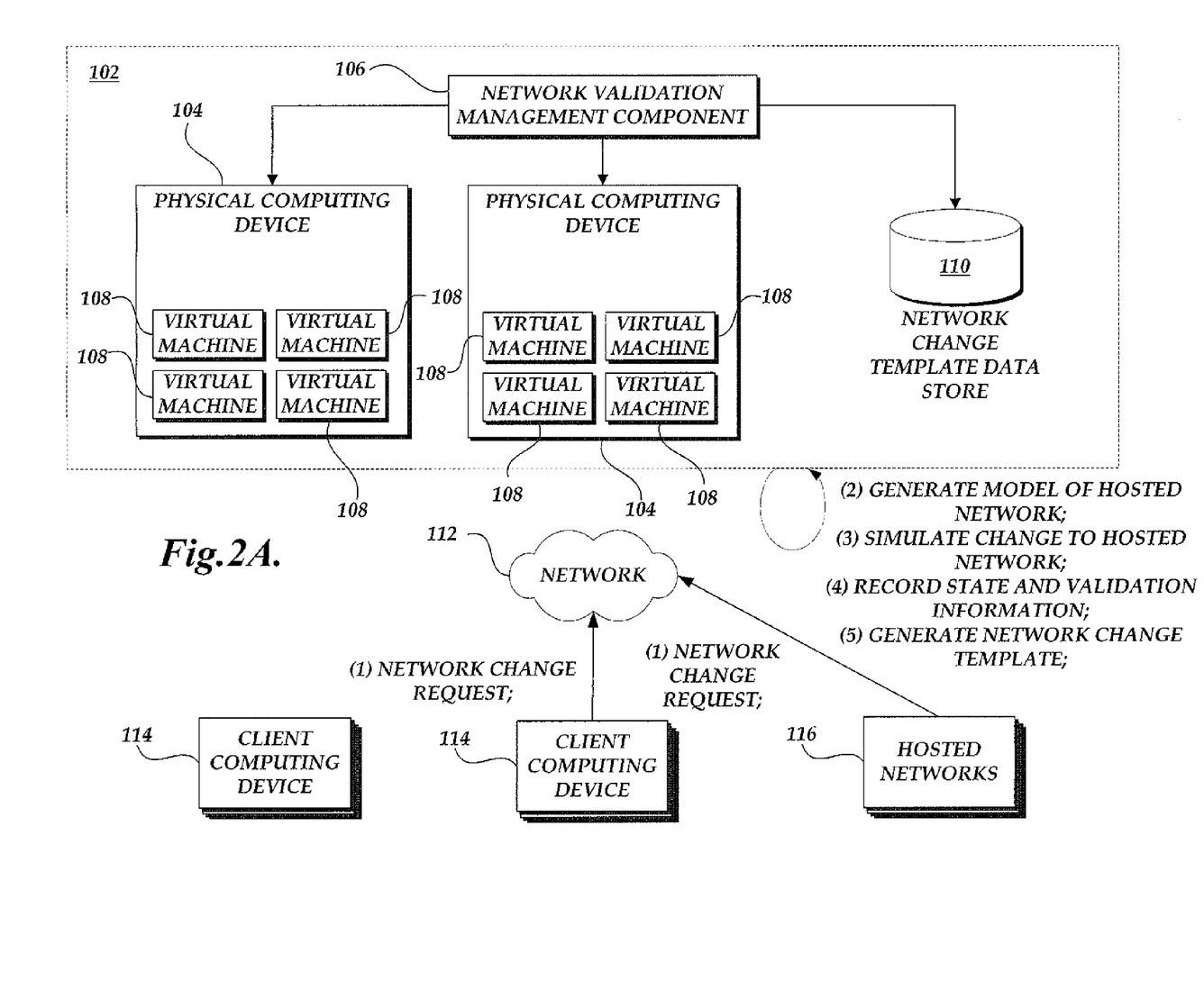
FIG. 2A is a simplified block diagram of the virtual network of FIG. 1 illustrating the generation of network change templates corresponding to a requested modification to a hosted network.
Figure 2B:
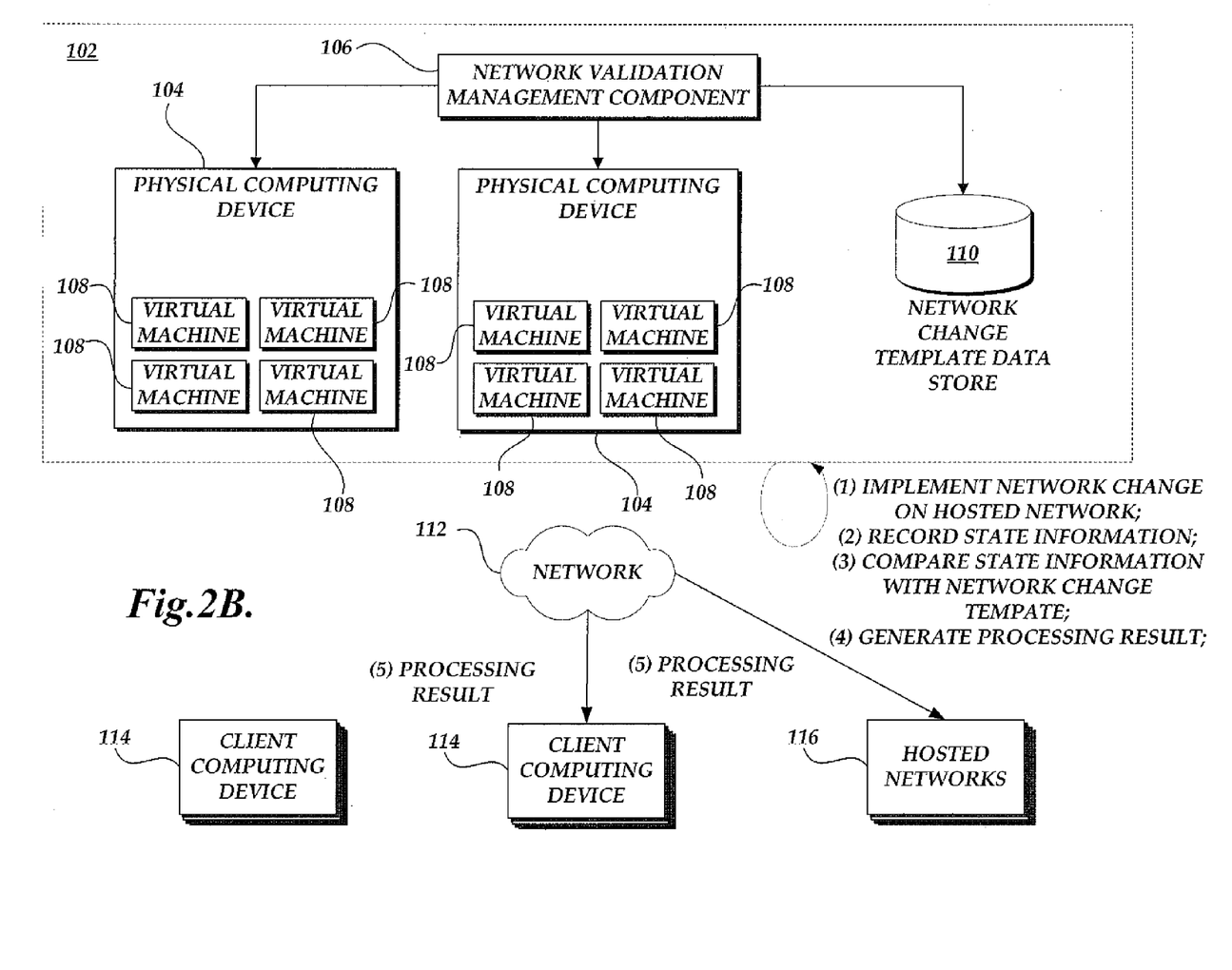
FIG. 2B is a simplified block diagram of the virtual network of FIG. 1 illustrating the monitoring of the implementation of a change to a hosted network in accordance with a network change template.

FIGS. 2A and 2B are block diagrams of the networked computing environment of FIG. 1 illustrating the generation of network change templates and the utilization of network change templates in the monitoring of the implementation of a change to a hosted network. As explained in detail below, a network validation manager component 106 can utilize simulations of a model of a hosted network to generate one or more network change templates. As illustrated in FIG. 2A, the network validation manager component 106 obtains a request for implementation of a network change can instantiate a number of instances of a virtual machine instance type, or cause the instantiation of the instances (1). Illustratively, the request for change includes, but is not limited to, modification to a network topology, modifications to configurations or attributes of components of the modeled, hosted network, substitutions/replacements to components of the modeled, hosted network, and the like. In one aspect, the request for a change to the hosted network can be received from a client computing device 114. Alternatively, the request for change to the hosted network device may be generated by, or on behalf of, the hosted network, such as hosted network 116. In one embodiment, the request for change can be transmitted in accordance with an Application Programming Interface (API). Illustratively, the request can include information specifying one or more aspects of the hosted network, the identified change, or additional information.

Based on the received request for implementation of a network change, the network validation manager component 106 generates or obtains a model of at least a portion of the hosted network (2). Illustratively, the network validation manager component 106 can utilize any one of a variety of network modeling and simulation tools. The network validation manager component 106 can include such modeling functionality or alternatively utilize a network-based modeling service. Additionally, in some embodiments, the network validation manager component 106 may already utilize pre-generated network models.

After generating, or otherwise obtaining, the network model, the network validation manager component 106 identifies one or more changes to the modeled hosted network. The network validation manager component 106 then simulates the implementation of the identified changes to the hosted network (3). As described above, the network validation manager component 106 can utilize a variety of network modeling and simulation tools that provide such simulation functionality. During the simulation of the implementation of the changes, the network validation manager component 106 can collect various types of information associated with the implementation of the change (4). In one aspect, the network validation manager component 106 collects state information associated with one or more of the simulated components of the hosted network. Examples of state information include routing table information and topological information, such as component relationship information, communication paths and routes, and the like. For example, the topological information can specify information related to the connectivity between two or more components of a modeled, hosted network. In another example, the topological information can also specify various communication mechanisms utilized between components of the modeled, hosted network, such as one or more communication protocols or configurations associated with a specific communication protocol.

In another aspect, the network validation manager component 106 conducts and collects information related to network validity information related to an assessment of the availability of one or more components of the hosted network, such as determining communication availability or conducting a communication path mapping. Illustratively, the network validation manager component 106 can store at least a subset of the information collected during the simulation of the change. Additionally, in the event that the simulation of a change results in a deterioration of the hosted network or a fault condition, the network validation manager component 106 generate additional notifications, such as an alarm.

In the event that the implementation of the identified change is successful, the network validation manager component 106 then generates a network change template that captures at least a portion of the state information or network validity information (5). Illustratively, the network change template can corresponds to an array of state information that identifies various expected state values for an identified component of the hosted network. The network validation manager component 106 can then store the generated network change templates. Additionally, in other embodiments, the network validation manager component 106 can publish or transmit the network change templates. For example, the network validation manager component 106 can transmit the network change templates to a requesting entity or a network-based service.

With reference now to FIG. 2B, upon the generation of the network change template(s) or upon some indication to implement a change in the hosted network, the network validation manager component 106 obtains the identification of changes to be implemented in the hosted network. In one embodiment, the network validation manager component 106 causes the initiation of the change in the hosted virtual or receives confirmation from a management component that network changes will be implemented (1). For example, the network validation manager component 106 can interact with a change deployment tool that actually implements the identified change.

As the one or more changes are being implemented on the hosted network, the network validation manager component 106 obtains and records state information associated with one or more of the components of the hosted network (2). The state information may be directly collected by the network validation manager component 106 or transmitted to the network validation manager component. In one embodiment, the network validation manager component 106 can collect the same state information, or a subset thereof, of the state information utilized to generate the network change template. In other embodiments, the network validation manager component 106 may omit the collection of some portion of the information, such as the network validity information.

In response to the collection of the state information, the network validation manager component 106 can then compare the collected state information with state information associated with the network change templates (3). In one embodiment, the network validation manager component 106 can extract relevant state information from network change template. In another embodiment, the network validation manager component 106 can derive one or more values of state information based on information included in the network change template.

With the appropriate information from the network change template, the network validation manager component 106 can determine whether the collected state information matches, or is within an acceptable range of, the state information from the network change template. If so, the implementation of the change in the hosted network proceeds as expected. If there is a different (absolute or significant), the network validation manager component 106 can determine that there is an error or fault in the implementation of the change on the hosted network.

Based on the comparison, the network validation manager component 106 can generate an appropriate processing result (4). For example, the network validation manager component 106 can generate one or more notifications or log entries. In another example, the network validation manager component 106 can initiate various mitigation techniques, such as a roll back, in the event non-matching state information is indicative of a fault condition. The network validation manager component 106 can implement additional or alternative mitigation techniques as well.

Figure 3:
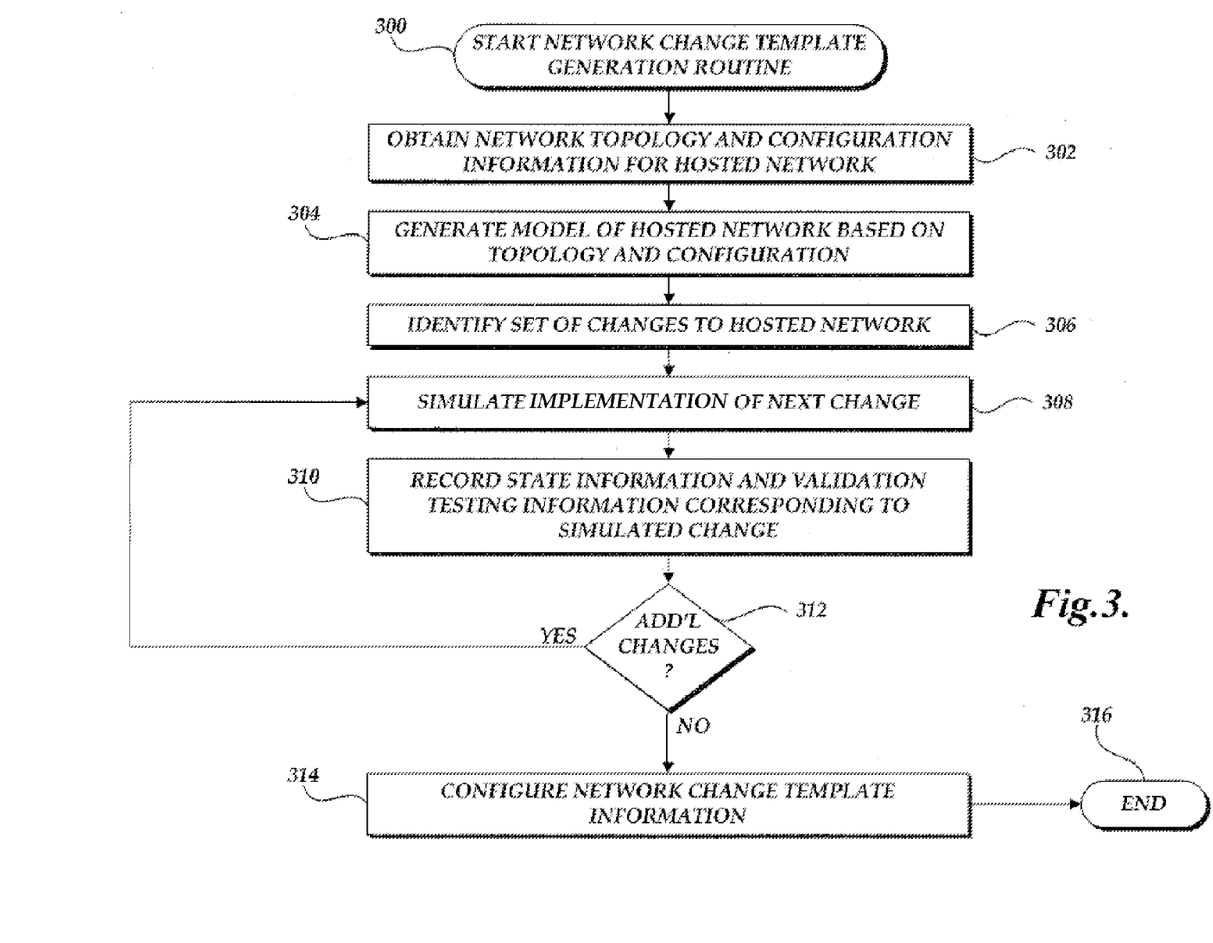
FIG. 3 is a flow diagram illustrating a network change template generation routine implemented by a network validation manager component.

Turning now to FIG. 3, a routine 300 implemented by the network validation manager component 106 for generating network change template information will be described. Although routine 300 will be described with regard to implementation by the network validation manager component 106, one skilled in the relevant art will appreciate that alternative components may implement routine 300 or that one or more of the blocks may be implemented by a different component or in distributed manner.

At block 302, the network validation manager component 106 obtains topology and configuration information for at least a portion of a hosted network. Based on the topology and configuration information, the network validation manager component 106 then generates a model of at least a portion of the hosted network at block 304. Illustratively, the network validation manager component 106 can utilize any one of a variety of network modeling and simulation tools. The network validation manager component 106 can include such modeling functionality or alternatively utilize a network-based modeling service. Additionally, in some embodiments, the network validation manager component 106 may already utilize pre-generated network model. For example, the hosted network topology information may be included as part of the request to implement a change to the hosted network. Still further, the network validation manager component 106 can also utilize additional tools to obtain the topology or configuration information.

At block 306, the network validation manager component 106 identifies a set of changes to be implemented on the hosted network. Illustratively, the network validation manager component 106 obtains a request for implementation of a network change can instantiate a number of instances of a virtual machine instance type, or cause the instantiation of the instances. In one aspect, the request for a change to the hosted network can be received from a client computing device 114. Alternatively, the request for change to the hosted network device may be generated by, or on behalf of, the hosted network, such as hosted network 116. Illustratively, the request for change can be transmitted in accordance with an Application Programming Interface (API). By way of non-limiting example, the set of changes can include modification of a configuration of one or more components of the modeled hosted network, modifications to the topology or relationships between components of the modeled hosted network, substitution or replacement of one or more components of the hosted, modeled network, and the like. For example, the requested change to a modeled network can include the substitution of a component (e.g., a router) that has different performance attributes or capabilities, than the component in the currently modeled, hosted network. Also, as previously described, the request for change can include or identify information utilized to obtain or generate models of the hosted network.

At block 308, the network validation manager component 106 then simulates the implementation of the identified changes to the hosted network. As described above, the network validation manager component 106 can utilize a variety of network modeling and simulation tools that provide such simulation functionality. During the simulation of the implementation of the changes, at block 310, the network validation manager component 106 can collect various types of information associated with the implementation of the change. In one aspect, the network validation manager component 106 collects state information associated with one or more of the simulated components of the hosted network. Examples of state information include routing table information and topological information, such as component relationship information, communication paths and routes, and the like.

In another aspect, the network validation manager component 106 conducts and collects information related to network validity information related to an assessment of the availability of one or more components of the hosted network, such as determining communication availability or conducting a communication path mapping. Illustratively, the network validation manager component 106 can store at least a subset of the information collected during the simulation of the change. Additionally, in the event that the simulation of a change results in a deterioration of the hosted network or a fault condition, the network validation manager component 106 generate additional notifications, such as an alarm. In such an event, the network validation manager component 106 may terminate the simulation of the implementation of the change.

At decision block 312, a test is conducted to determine whether there are additional changes to implemented (or modeled). If so, the routine 300 returns to block 308. Alternatively, once all the changes have been simulated, at block 314, the network validation manager component 106 then generates a network change template that captures at least a portion of the state information or network validity information. Illustratively, the network change template can corresponds to an array of state information that identifies various expected state values for an identified component of the hosted network. The network validation manager component 106 can then store the generated network change templates. Additionally, in other embodiments, the network validation manager component 106 can publish or transmit the network change templates. For example, the network validation manager component 106 can transmit the network change templates to a requesting entity or a network-based service.

Figure 4:
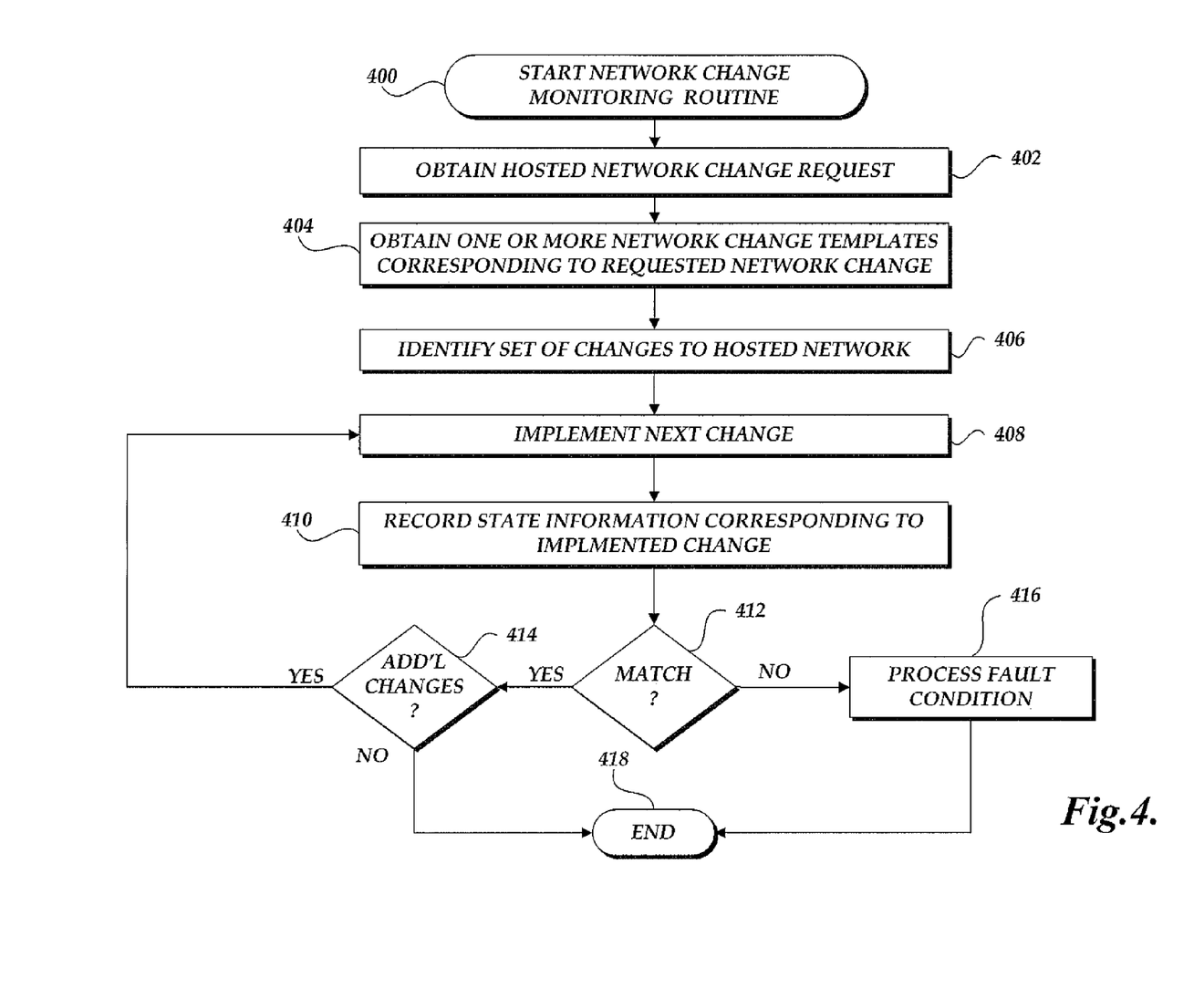
FIG. 4 is a flow diagram illustrative a network change processing routine implemented by a network validation manager component.

Turning now to FIG. 4, a routine 400 for network change monitoring implemented by the network validation manager component 106 will be described. As discussed with regard to routine 300 (FIG. 3), although routine 400 will be described with regard to implementation by the network validation manager component 106, one skilled in the relevant art will appreciate that alternative components may implement routine 400 or that one or more of the blocks may be implemented by a different component or in distributed manner. At block 402, the network validation manager component 106 obtains a hosted network change request. At block 404, the network validation manager component 106 obtains one or more network change templates corresponding to the requested network change. Illustratively, the network validation manager component 106 can obtain previously generated network change template information from the network change template data store 110 (FIG. 1).

At block 406, the network validation manager component 106 identifies one or more changes to be implemented on the hosted network. At block 408, the network validation manager component 106 causes the initiation of the change in the hosted virtual or receives confirmation from a management component that network changes will be implemented. For example, the network validation manager component 106 can interact with a change deployment tool that actually implements the identified change. As previously described, the change to the hosted network can occur within the virtual network 102 or in a network independent of the virtual network.

As the one or more changes are being implemented on the hosted network, the network validation manager component 106 obtains state information associated with one or more of the components of the hosted network and records the information at block 410. The state information may be directly collected by the network validation manager component 106 or transmitted to the network validation manager component. In one embodiment, the network validation manager component 106 can collect the same state information, or a subset thereof, of the state information utilized to generate the network change template. In other embodiments, the network validation manager component 106 may omit the collection of information, such as the network validity information.

In response to the collection of the state information, at decision block 412, a test is conducted by the network validation manager component 106 to determine whether the collected state information matches the state information associated with the network change templates. In one embodiment, the network validation manager component 106 can extract relevant state information from network change template. In another embodiment, the network validation manager component 106 can derive one or more values of state information based on information included in the network change template. Illustratively, the network validation manager component 106 may utilize any one of a variety of techniques for determining matches, such as a determination whether an exact match occurs. In another example, the network validation manager component 106 may determine whether differences between the compared state information are above a threshold.

One skilled in the relevant art will appreciate that in the event the state information does not match, or otherwise exceeds a threshold, an error or fault condition is likely occurring in the implementation of the change on the hosted network. Accordingly, if the collected state information does not match, at block 416, the network validation manager component 106 processes the fault condition and the routine 400 terminates at block 418. In one embodiment, the processing of the fault condition can include the generation of notifications, alarms, messages, and the like. In another embodiment, the processing of the fault condition can also include the initiation of a mitigation technique, such as restoration of one or more components of hosted network to a previously known state.

Returning again to decision block 412, if the collected state information matches, at decision block 414, a test is conducted to determine whether additional changes are to be implemented. If so, the routine 400 returns to block 408. Alternatively, the routine 400 terminates at block 418.

With the appropriate information from the network change template, the network validation manager component 106 can determine whether the collected state information matches, or is within an acceptable range of, the state information from the network change template. If so, the implementation of the change in the hosted network is likely proceeding as expected and no fault condition exists. If there is a different (absolute or significant), the network validation manager component 106 can determine that there is an error or fault in the implementation of the change on the hosted network. Based on the comparison, the network validation manager component 106 can generate an appropriate processing result. For example, the network validation manager component 106 can generate one or more notifications or log entries. In another example, the network validation manager component 106 can initiate various mitigation techniques, such as a roll back, in the event non-matching state information is indicative of a fault condition. The network validation manager component 106 can implement additional or alternative mitigation techniques as well.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for managing hosted networks comprising:
   a first computing device, having a processing unit and a memory, the first computing device for generating information associated with network changes, the information generated by:
      causing modeling of at least a portion of a hosted network;
      identifying a set of changes to be implemented on the modeled at least a portion of the hosted network;
      obtaining information corresponding to a simulation of the set of changes on the modeled at least a portion of the hosted network, wherein the information corresponding to the simulation of the set of changes comprises network validity information; and
      generating an array of state information, the generated array of state information associated with components of the at least a portion of the hosted network, the state information corresponding to the simulation of the set of changes; and
   a second computing device, having a processing unit and a memory, the second computing device for monitoring network changes based on:
      identifying the set of changes to be implemented on the hosted network;
      obtaining information corresponding to an implementation of the set of changes on the hosted network;
      comparing state information in the generated array of state information corresponding to the simulation of the set of changes with the information corresponding to the implementation of the set of changes on the hosted network; and
      generating a processing result based on the comparison between the state information corresponding to the simulation of the set of changes and the information corresponding to the implementation of the set of changes.

2. The system as recited in claim 1, wherein the first and second computing devices are the same.

3. The system as recited in claim 1, wherein obtaining information corresponding to a simulation of the set of changes on the modeled at least a portion of the hosted network includes obtaining state information and network validity information.

4. The system as recited in claim 1, wherein generating a processing result based on the comparison includes identifying if the state information in the generated array of state information does not match the information corresponding to the implementation of the set of changes on the hosted network.

5. The system as recited in claim 1, the second computing device is configured to initiate a roll-back of the set of changes when the processing result indicates the implementation of the set of changes does not match the simulation of the set of changes.

6. A method for managing hosted networks comprising:
   identifying a set of changes to be implemented on a modeled portion of a hosted network;
   obtaining information corresponding to a simulation of the set of changes on the modeled portion of the hosted network, wherein the information corresponding to the simulation of the set of changes comprises network validity information;
   generating network change template information corresponding to information associated with components of the at least a portion of the modeled portion of the hosted network, the information corresponding to the simulation of the set of changes;

comparing the network change template information corresponding to the simulation of the set of changes with information corresponding to an implementation of the set of changes on the hosted network; and generating a processing result based on the comparison between the network change template information corresponding to the simulation of the set of changes and the information corresponding to the implementation of the set of changes.

7. The method as recited in claim 6, wherein the set of changes include a substitution of a component in the modeled portion of the hosted network, wherein a substituted component includes at least one different attribute.

8. The method as recited in claim 6, wherein the set of changes include a modification of a network configuration.

9. The method as recited in claim 6, wherein obtaining information corresponding to a simulation the set of changes on the modeled portion of the hosted network includes obtaining state information associated with one or more components in the modeled portion of the hosted network.

10. The method as recited in claim 9, wherein the state information corresponds to routing tables utilized by at least one component in the modeled portion of the hosted network.

11. The method as recited in claim 9, wherein the state information corresponds to topological relationships between two or more components of the modeled portion of the hosted network.

12. The method as recited in claim 6, wherein obtaining information corresponding to a simulation the set of changes on the modeled portion of the hosted network includes obtaining network validity information related to the availability of one or more components of the modeled portion of the hosted network.

13. The method as recited in claim 6 further comprising causing modeling of at least a portion of the hosted network.

14. The method as recited in claim 6, wherein the network change template information corresponds to an array of state information, the generated array including state information associated with components of the at least a portion of the modeled hosted network.

15. The system as recited in claim 6, further comprising initiating a roll-back of the roll-back of the set of changes when the processing result indicates the implementation of the set of changes does not match the simulation of the set of changes.

16. A method for managing hosted networks comprising:
identifying a set of changes to be implemented on a hosted network;

obtaining information corresponding to an implementation of the set of changes on the hosted network;

comparing information in a network change template corresponding to a simulation of the set of changes on the hosted network with the information corresponding to the implementation of the set of changes on the hosted network, wherein the information corresponding to the simulation of the set of changes comprises network validity information; and generating a processing result based on the comparison between the information corresponding to the simulation of the set of changes and the information corresponding to the implementation of the set of changes.

17. The method as recited in claim 16, wherein the set of changes include a modification of a network topology.

18. The method as recited in claim 16, wherein the set of changes include a modification of a network configuration.

19. The method as recited in claim 16, wherein obtaining information corresponding to a simulation of the set of changes on the hosted network includes obtaining state information associated with one or more components in the hosted network.

20. The method as recited in claim 19, wherein the state information corresponds to routing tables utilized by at least one component in the hosted network.

21. The method as recited in claim 19, wherein the state information corresponds to topological relationships between two or more components of the hosted network.

22. The method as recited in claim 19, wherein generating a processing result based on the comparison includes generating a fault condition if the state information in a network change template does not match the information corresponding to the implementation of the set of changes on the hosted network.

23. The method as recited in claim 16, wherein generating a processing result based on the comparison includes generating a fault condition if a difference between state information in a network change template and the information corresponding to the implementation of the set of changes on the hosted network exceeds a threshold.

24. The method as recited in claim 16, wherein the network change template information corresponds to an array of state information, the generated array of including state information associated with components of the at least a portion of the modeled hosted network.

25. The system as recited in claim 16, further comprising initiating a roll-back of the roll-back of the set of changes when the processing result indicates the implementation of the set of changes does not match the simulation of the set of changes.

* * * * *